United States Patent
Asano et al.

(10) Patent No.: US 11,094,965 B2
(45) Date of Patent: Aug. 17, 2021

(54) NON-AQUEOUS ELECTROLYTIC SOLUTION FOR LITHIUM ION SECONDARY CELL

(71) Applicant: TOYOTA JIDOSHA KABUSHIKI KAISHA, Toyota (JP)

(72) Inventors: Hiroto Asano, Nisshin (JP); Shimpei Kondo, Nagoya (JP); Akira Kohyama, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/572,919

(22) Filed: Sep. 17, 2019

(65) Prior Publication Data

US 2020/0091555 A1    Mar. 19, 2020

(30) Foreign Application Priority Data

Sep. 19, 2018    (JP) .............................. JP2018-175176

(51) Int. Cl.
*H01M 10/0567* (2010.01)
*H01M 10/0568* (2010.01)
*H01M 10/0525* (2010.01)

(52) U.S. Cl.
CPC ... *H01M 10/0567* (2013.01); *H01M 10/0525* (2013.01); *H01M 10/0568* (2013.01); *H01M 2300/0025* (2013.01)

(58) Field of Classification Search
CPC ......... H01M 10/0525; H01M 10/0567; H01M 10/0568; H01M 2220/20; H01M 2300/0025
See application file for complete search history.

(56) References Cited

U.S. PATENT DOCUMENTS

| 6,350,546 B1 | 2/2002 | Gan et al. |
| 2002/0197537 A1 | 12/2002 | Kim et al. |
| 2020/0373617 A1* | 11/2020 | Kim ...................... H01M 4/364 |

FOREIGN PATENT DOCUMENTS

| JP | 2002-359001 A | 12/2002 | |
| JP | 2006-244739 A | 9/2006 | |
| JP | 2011-034893 A | 2/2011 | |
| WO | WO-2019050161 A1 * | 3/2019 | .............. H01M 4/38 |

* cited by examiner

*Primary Examiner* — Carlos Barcena

(74) *Attorney, Agent, or Firm* — Sughrue Mion, PLLC

(57) ABSTRACT

Provided is a non-aqueous electrolytic solution for a lithium ion secondary cell that can reduce the initial resistance of the lithium ion secondary cell and can suppress the increase in resistance when the lithium ion secondary cell is allowed to stand at high temperature. The non-aqueous electrolytic solution for a lithium ion secondary cell disclosed herein includes a light metal salt represented by the following formula (I) and a silyl sulfate compound represented by the following formula (II). The content of the light metal salt in the non-aqueous electrolytic solution for a lithium ion secondary cell is 0.1% by mass or more and 1.5% by mass or less. The content of the silyl sulfate compound in the non-aqueous electrolytic solution for a lithium ion secondary cell is 0.1% by mass or more and 5.0% by mass or less (each symbol in the formulas is as defined in the specification).

[C1]

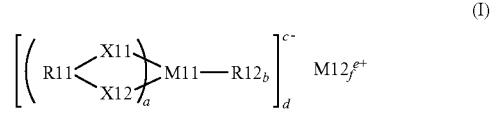

(I)

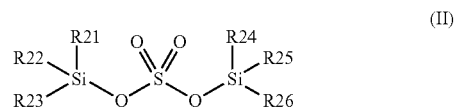

(II)

5 Claims, 2 Drawing Sheets

NON-AQUEOUS ELECTROLYTIC SOLUTION FOR LITHIUM ION SECONDARY CELL

BACKGROUND OF THE INVENTION

1. Field of the Invention

The present teaching relates to a non-aqueous electrolytic solution for a lithium ion secondary cell. The present application claims priority based on Japanese Patent Application No. 2018-175176 filed on Sep. 19, 2018, the entire contents of the application being incorporated herein by reference.

2. Description of the Related Art

In recent years, lithium ion secondary cells have been suitably used for portable power sources such as personal computers and portable terminals, and power sources for driving vehicles such as electric vehicles (EVs), hybrid vehicles (HVs) and plug-in hybrid vehicles (PHVs).

It is a known technique to include a light metal salt such as an oxalate complex in a non-aqueous electrolytic solution in order to improve a cycle characteristic, a storage characteristic and the like of a lithium ion secondary cell. However, when a light metal salt such as an oxalate complex is included in a non-aqueous electrolytic solution, an initial resistance is increased. In a lithium ion secondary cell for driving a vehicle, from the viewpoint of output improvement, it is desirable that the resistance be low. Therefore, in order to reduce resistance, Japanese Patent Application Publication No. 2011-034893 suggests including acetonitrile in addition to an oxalate complex in a non-aqueous electrolytic solution.

SUMMARY OF THE INVENTION

However, according to the study conducted by the inventors of the present teaching, although the technique disclosed in Japanese Patent Application Publication No. 2011-034893 in which acetonitrile is added to the non-aqueous electrolytic solution can reduce the initial resistance, there is a problem that the resistance increases when a cell is allowed to stand at high temperature, and it has been found that the reduction of initial resistance does not necessarily lead to the suppression of the increase in resistance when the cell is allowed to stand at high temperature.

Accordingly, it is an object of the present teaching to provide a non-aqueous electrolytic solution for a lithium ion secondary cell that can reduce the initial resistance of the lithium ion secondary cell and can suppress the increase in resistance of the lithium ion secondary cell when the cell is allowed to stand at high temperature.

The non-aqueous electrolytic solution for a lithium ion secondary cell disclosed herein includes a light metal salt represented by the following formula (I) and a silyl sulfate compound represented by the following formula (II). The content of the light metal salt in the non-aqueous electrolytic solution for a lithium ion secondary cell is 0.1% by mass or more and 1.5% by mass or less. The content of the silyl sulfate compound in the non-aqueous electrolytic solution for a lithium ion secondary cell is 0.1% by mass or more and 5.0% by mass or less.

[C1]

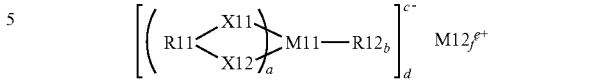
(I)

(wherein R11 represents a —C(=O)—R—C(=O)— group (R represents an alkylene group, a halogenated alkylene group, an arylene group, or a halogenated arylene group), or a —C(=O)—C(=O)— group; R12 represents a halogen atom, an alkyl group, a halogenated alkyl group, an aryl group or a halogenated aryl group; X11 and X12 independently represent an oxygen atom or a sulfur atom; M11 represents a transition metal element or a Group 13 element, a Group 14 element or a Group 15 element in the periodic table; M12 represents a Group 1 element, a Group 2 element in the periodic table, or an aluminum element; a is an integer of 1 to 4; b is an integer of 0 to 8; c is an integer of 1 to 3; d is an integer of 1 to 3; e is an integer of 1 to 3; and f is an integer of 1 to 3).

[C2]

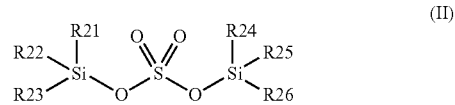
(II)

(wherein R21 to R26 each independently represent a $C_1$-$C_4$ alkyl group that may be substituted with a fluorine atom, a $C_2$-$C_4$ alkenyl group that may be substituted with a fluorine atom, a group in which an oxygen atom is inserted into a carbon-carbon bond of a $C_2$-$C_4$ alkyl group, or a group in which an oxygen atom is inserted into a carbon-carbon bond of a $C_3$-$C_4$ alkenyl group).

According to such a configuration, it is possible to provide a non-aqueous electrolytic solution for a lithium ion secondary cell that can reduce the initial resistance of the lithium ion secondary cell and can suppress the increase in resistance of the lithium ion secondary cell when the cell is allowed to stand at high temperature.

In a desirable embodiment of the non-aqueous electrolytic solution for a lithium ion secondary cell disclosed herein, the light metal salt is at least one oxalate complex selected from the group consisting of lithium bis(oxalato)borate, lithium difluoro(oxalato)borate, lithium difluorobis(oxalato)phosphate, and lithium tetrafluoro(oxalato)phosphate.

According to such a configuration, the effects of the present teaching are further enhanced.

A lithium ion secondary cell disclosed herein includes the above-described non-aqueous electrolytic solution for a lithium ion secondary cell.

According to such a configuration, it is possible to provide a lithium ion secondary cell that has a small initial resistance and a small increase in resistance when the lithium ion secondary cell is allowed to stand at high temperature.

DESCRIPTION OF THE PREFERRED EMBODIMENTS

Figure 1:
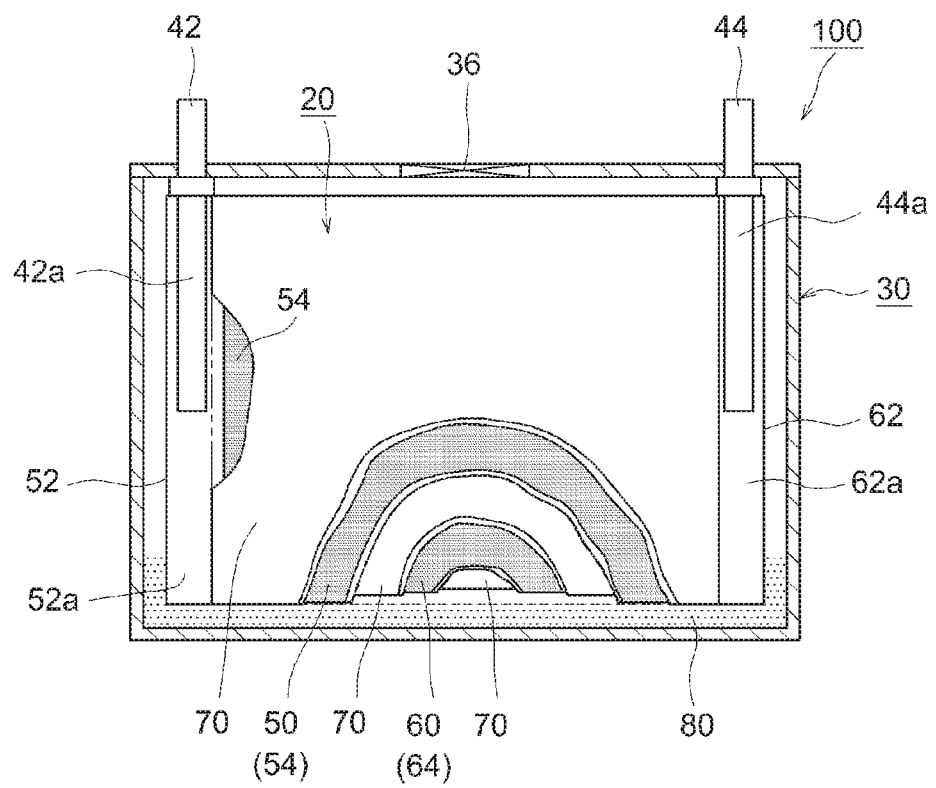
FIG. 1 is a cross-sectional view schematically showing the internal structure of a lithium ion secondary cell using a non-aqueous electrolytic solution according to an embodiment of the present teaching.

Hereinafter, embodiments of the present teaching will be described. In the present specification, any features other than matters specifically mentioned in the present specification and that may be necessary for carrying out the present teaching (for example, the general configuration of the non-aqueous electrolytic solution for lithium ion secondary cell and manufacturing process which do not characterize the present teaching) can be understood as design matters for a person skilled in the art which are based on the related art. The present teaching can be implemented based on the contents disclosed in the present specification and common technical knowledge in the field.

In the present specification, the term "secondary cell" refers to a repeatedly chargeable and dischargeable storage device in general, and is a term inclusive of a storage device such as so-called storage cell and electric double layer capacitor.

Further, in the present specification, the term "lithium ion secondary cell" refers to a secondary cell in which lithium ions are used as charge carriers and charge and discharge are realized by the movement of charges associated with lithium ions between positive and negative electrodes.

The non-aqueous electrolytic solution for a lithium ion secondary cell according to the present embodiment includes a light metal salt represented by the following formula (I) and a silyl sulfate compound represented by the following formula (II). The content of the light metal salt in the non-aqueous electrolytic solution for a lithium ion secondary cell (i.e., with respect to the total mass of the non-aqueous electrolytic solution for a lithium ion secondary cell) is 0.1% by mass or more and 1.5% by mass or less. The content of the silyl sulfate compound in the non-aqueous electrolytic solution for a lithium ion secondary cell is 0.1% by mass or more and 5.0% by mass or less.

[C3]

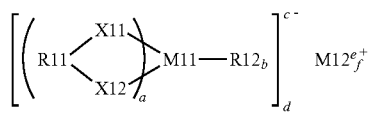
(I)

(wherein R11 represents a —C(=O)—R—C(=O)— group (R represents an alkylene group, a halogenated alkylene group, an arylene group, or a halogenated arylene group), or a —C(=O)—C(=O)— group; R12 represents a halogen atom, an alkyl group, a halogenated alkyl group, an aryl group or a halogenated aryl group; X11 and X12 independently represent an oxygen atom or a sulfur atom; M11 represents a transition metal element or a Group 13 element, a Group 14 element or a Group 15 element in the periodic table; M12 represents a Group 1 element, a Group 2 element in the periodic table, or an aluminum element; a is an integer of 1 to 4; b is an integer of 0 to 8; c is an integer of 1 to 3; d is an integer of 1 to 3; e is an integer of 1 to 3; and f is an integer of 1 to 3).

[C4]

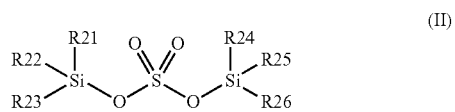
(II)

(wherein R21 to R26 each independently represent a $C_1$-$C_4$ alkyl group that may be substituted with a fluorine atom, a $C_2$-$C_4$ alkenyl group that may be substituted with a fluorine atom, a group in which an oxygen atom is inserted into a carbon-carbon bond of a $C_2$-$C_4$ alkyl group, or a group in which an oxygen atom is inserted into a carbon-carbon bond of a $C_3$-$C_4$ alkenyl group).

Light Metal Salt Represented by Formula (I)

The light metal salt represented by the formula (I) is a component that functions as a film forming agent.

R11 represents a —C(=O)—R—C(=O)— group (R represents an alkylene group, a halogenated alkylene group, an arylene group, or a halogenated arylene group), or a —C(=O)—C(=O)— group.

Regarding the —C(=O)—R—C(=O)— group represented by R11, the alkylene group represented by R may be linear, branched or cyclic. The carbon number of the alkylene group is desirably 1 to 4, and more desirably 1 to 2. Examples of the alkylene group include a methylene group, an ethylene group, a propylene group, a 2-methylpropylene group, a 1,1-dimethylethylene group and the like.

The halogenated alkylene group represented by R may be linear, branched or cyclic. The carbon number of the halogenated alkylene group is desirably 1 to 4, and more desirably 1 to 2. Examples of the halogen atom in the halogenated alkylene group include a fluorine atom, a chlorine atom, a bromine atom, an iodine atom and the like. The number of halogen atoms in the halogenated alkylene group is desirably 1 to 4, and more desirably 1 to 2. The halogenated alkylene group can be exemplified by a group in which a hydrogen atom of the alkylene group exemplified hereinabove is substituted with a halogen atom.

Examples of the arylene group represented by R include a phenylene group, a naphthalenediyl group and the like.

Examples of the halogen atom in the halogenated arylene group represented by R include a fluorine atom, a chlorine atom, a bromine atom, an iodine atom and the like. The number of halogen atoms contained in the halogenated arylene group is desirably 1 to 2, and more desirably 1. The halogenated arylene group can be exemplified by a group in which a hydrogen atom of the arylene group exemplified hereinabove is substituted with a halogen atom.

As R11, a —C(=O)—C(=O)— group is desirable.

R12 represents a halogen atom, an alkyl group, a halogenated alkyl group, an aryl group or a halogenated aryl group.

Examples of the halogen atom represented by R12 include a fluorine atom, a chlorine atom, a bromine atom, an iodine atom and the like. Among them, a fluorine atom is desirable.

The alkyl group represented by R12 may be linear, branched or cyclic. The carbon number of the alkyl group is desirably 1 to 6, and more desirably 1 to 4. Examples of the alkyl group include a methyl group, an ethyl group, an n-propyl group, an isopropyl group, an n-butyl group, an isobutyl group, a sec-butyl group, a tert-butyl group, an n-pentyl group, an n-hexyl group, and a cyclohexyl group.

The halogenated alkyl group represented by R12 may be linear, branched or cyclic. The carbon number of the halogenated alkyl group is desirably 1 to 6, and more desirably 1 to 4. Examples of the halogen atom in the halogenated alkyl group include a fluorine atom, a chlorine atom, a bromine atom, an iodine atom and the like. The number of halogen atoms contained in the halogenated alkyl group is desirably 1 to 5, and more desirably 1 to 3. The halogenated alkyl group can be exemplified by a group in which a hydrogen atom of the alkyl group exemplified hereinabove is substituted with a halogen atom.

Examples of the aryl group represented by R12 include a phenyl group and a naphthyl group. Among them, a phenyl group is desirable.

Examples of the halogen atom in the halogenated aryl group represented by R12 include a fluorine atom, a chlorine atom, a bromine atom, an iodine atom and the like. The number of halogen atoms in the halogenated aryl group is desirably 1 to 2, and more desirably 1. The halogenated aryl group can be exemplified by a group in which a hydrogen atom of the aryl group exemplified hereinabove is substituted with a halogen atom.

R12 is desirably a halogen atom, and more desirably a fluorine atom.

X11 and X12 independently represent an oxygen atom or a sulfur atom. X11 and X12 are desirably oxygen atoms.

M11 represents a transition metal element, or a Group 13 element, a Group 14 element or a Group 15 element in the periodic table. M11 is desirably a Group 13 element and a Group 15 element, and more desirably boron (B) and phosphorus (P).

M12 represents a Group 1 element or a Group 2 element in the periodic table, or an aluminum element. M12 is desirably a Group 1 element, and more desirably lithium (Li).

a is an integer of 1 to 4, and desirably an integer of 1 to 2;

b is an integer of 0 to 8, and desirably an integer of 0 to 4;

c is an integer of 1 to 3, and desirably 1;

d is an integer of 1 to 3, and desirably 1;

e is an integer of 1 to 3, and desirably 1; and f is an integer of 1 to 3, and desirably 1.

The light metal salt represented by the formula (I) is particularly desirably at least one oxalate complex selected from the group consisting of lithium bis(oxalato)borate (LiBOB), lithium difluoro(oxalato)borate (LiDFOB), lithium difluorobis(oxalato)phosphate (LiPFO), and lithium tetrafluoro(oxalato)phosphate (LiTFOP).

When the content of the light metal salt represented by the formula (I) in the non-aqueous electrolytic solution is too small, the increase in resistance when the cell is allowed to stand at high temperature becomes large. Therefore, the content of the light metal salt is 0.1% by mass or more, desirably 0.3% by mass or more, and more desirably 0.5% by mass or more. Meanwhile, where the content of the light metal salt is too large, the initial resistance becomes large. Therefore, the content of the light metal salt is 1.5% by mass or less, desirably 1.0% by mass or less, and more desirably 0.7% by mass or less.

Silyl Sulfate Compound Represented by Formula (II)

In the formula (II), R21 to R26 each independently represent a $C_1$-$C_4$ alkyl group that may be substituted with a fluorine atom, a $C_2$-$C_4$ alkenyl group that may be substituted with a fluorine atom, a group in which an oxygen atom is inserted into a carbon-carbon bond of a $C_2$-$C_4$ alkyl group, or a group in which an oxygen atom is inserted into a carbon-carbon bond of a $C_3$-$C_4$ alkenyl group.

The $C_1$-$C_4$ alkyl group that may be substituted with a fluorine atom, which is represented by R21 to R26, may be linear or branched. The carbon number of the alkyl group is desirably 1 to 3. When the alkyl group is substituted with a fluorine atom, the number of fluorine atoms is desirably 1 to 5, and more desirably 1 to 3. Examples of the alkyl group include a methyl group, an ethyl group, an n-propyl group, an isopropyl group, an n-butyl group, an isobutyl group, a sec-butyl group and a tert-butyl group, and groups in which a hydrogen atom of these groups is substituted with a fluorine atom.

The $C_2$-$C_4$ alkenyl group that may be substituted with a fluorine atom, which is represented by R21 to R26, may be linear or branched. The carbon number of the alkenyl group is desirably 2 to 3. When the alkenyl group is substituted with a fluorine atom, the number of fluorine atoms is desirably 1 to 3. Examples of the alkenyl group include a vinyl group, an allyl group, a 1-propenyl group, a butenyl group, and groups obtained in which a hydrogen atom of these groups is substituted with a fluorine atom.

The group in which an oxygen atom is inserted into a carbon-carbon bond of a $C_2$-$C_4$ alkyl group, which is represented by R21 to R26, may be linear or branched. The carbon number of the group is desirably 2 to 3. The number of oxygen atoms inserted into the group is desirably 1. Examples of the group include a methoxymethyl group, an ethoxymethyl group, a methoxyethyl group, an ethoxyethyl group, a methoxypropyl group and the like.

The group in which an oxygen atom is inserted into a carbon-carbon bond of a $C_3$-$C_4$ alkenyl group, which is represented by R21 to R26, may be linear or branched. The number of oxygen atoms inserted in the group is desirably 1. Examples of the group include a vinyloxymethyl group, a vinyloxyethyl group and the like.

As R21 to 26, a $C_1$-$C_4$ alkyl group and a group in which an oxygen atom is inserted into a carbon-carbon bond of a $C_2$-$C_4$ alkyl group are desirable, and a $C_1$-$C_3$ alkyl group, a methoxymethyl group, an ethoxymethyl group, and a methoxyethyl group are more desirable.

When the content of the silyl sulfate compound represented by the formula (II) in the non-aqueous electrolytic solution is too small, the initial resistance is increased. Therefore, the content of the silyl sulfate compound is 0.1% by mass or more, and desirably 1% by mass or more. Meanwhile, when the content of the silyl sulfate compound is too large, the initial resistance tends to be large, and the resistance increase when the cell is allowed to stand at high temperature tends to be large. Therefore, the content of the silyl sulfate compound is 5% by mass or less, desirably 3% by mass or less, and more desirably 2% by mass or less.

The non-aqueous electrolytic solution for a lithium ion secondary cell according to the present embodiment includes a silyl sulfate compound represented by the formula (II) in addition to a light metal salt represented by the formula (I). As a result, the initial resistance of the lithium ion secondary cell can be reduced, and an increase in the resistance of the lithium ion secondary cell when the cell is allowed to stand at high temperature can be suppressed. In particular, as shown in the results of Examples and Comparative Examples described hereinbelow, the initial resistance reduction effect and the resistance increase suppression effect when the cell is allowed to stand at high temperature, which are obtained in the present embodiment, are greater than the sum total of the effect obtained with the light metal salt alone and the effect obtained with the silyl sulfate compound alone.

The inventors of the present teaching have actually produced a lithium ion secondary cell using a non-aqueous electrolytic solution including the above light metal salt and the above silyl sulfate compound, and conducted various analyses. As a result, in X-ray electron spectroscopy (XPS) analysis, it was found that a sulfur (S) element is taken in the form of SOx in the coating film formed on the electrode.

Therefore, the following reason why the above effects can be obtained is considered.

A fluorine ion (F) is dissociated from the electrolyte salt including a fluorine atom, and the ion is bonded to Si of the silyl sulfate compound, thereby breaking the Si—O bond. As a result, a sulfate anion ($SO_4^{2-}$) is formed. In addition, the light metal salt is reductively decomposed to form a coating film on the electrode. At this time, this sulfate anion is taken into the coating film, and the sulfate anion is mixed in with the coating film, thereby forming a coating film that has a low resistance. Moreover, the coating film is thereby also strong and excellent in resistance to high temperature, and thus, a state of the low-resistance of the coating film is maintained.

The non-aqueous electrolytic solution for a lithium ion secondary cell according to the present embodiment usually includes an electrolyte salt and a non-aqueous solvent.

The electrolyte salt is typically an electrolyte salt including a fluorine atom, and any electrolyte salt which has been used for lithium ion secondary cells can be used without particular limitation. The electrolyte salt is desirably a lithium salt including a fluorine atom. Examples of the lithium salt include $LiPF_6$, $LiBF_4$, lithium bis(fluorosulfonyl)imide (LiFSI), lithium bis(trifluoromethane)sulfonimide (LiTFSI) and the like. These can be used singly or in combination of two or more types thereof.

The concentration of the electrolyte salt in the non-aqueous electrolytic solution may be determined, as appropriate, according to the type of the electrolyte salt. The concentration of the electrolyte salt in the non-aqueous electrolytic solution is typically 0.5 mol/L or more and 5 mol/L or less, and desirably 0.7 mol/L or more and 2.5 mol/L or less.

The non-aqueous solvent dissolves the above-mentioned electrolyte salt. The type of non-aqueous solvent is not particularly limited as long as it can dissolve the above-mentioned electrolyte salt, and carbonates, ethers, esters, nitriles, sulfones, or the like which have been used in electrolytic solutions for lithium ion secondary cells can be used. Among them, a carbonate is desirable. Examples of the carbonate include ethylene carbonate (EC), propylene carbonate (PC), diethyl carbonate (DEC), dimethyl carbonate (DMC), ethyl methyl carbonate (EMC) and the like. These can be used singly or in combination of two or more types thereof.

The non-aqueous electrolytic solution for a lithium ion secondary cell according to the present embodiment may include for example, a gas generating agent such as biphenyl (BP) or cyclohexylbenzene (CHB), other film-forming agent, a dispersant, a thickener, and the like as long as the effects of the present teaching are not significantly impaired.

According to the non-aqueous electrolytic solution for a lithium ion secondary cell of the present embodiment, the initial resistance of the lithium ion secondary cell can be reduced, and the increase in resistance of the lithium ion secondary cell when the cell is allowed to stand at high temperature can be suppressed. Furthermore, the capacity deterioration of the lithium ion secondary cell when the cell is allowed to stand at high temperature can be suppressed.

Therefore, the lithium ion secondary cell including the non-aqueous electrolytic solution for a lithium ion secondary cell according to the present embodiment has a small initial resistance, and the increase in resistance when the cell is allowed to stand at high temperature is suppressed. In addition, the capacity deterioration when the cell is allowed to stand at temperature storage is suppressed.

The non-aqueous electrolytic solution for a lithium ion secondary cell according to the present embodiment can be used for a lithium ion secondary cell according to a known method.

An outline of a configuration example of a lithium ion secondary cell using the non-aqueous electrolytic solution for a lithium ion secondary cell according to the present embodiment will be described below with reference to the drawings. In the following drawings, the same reference numerals are given to members and parts that exhibit the same action. In addition, dimensional relationships (length, width, thickness, and the like) in the drawings do not reflect actual dimensional relationships.

A lithium ion secondary cell 100 shown in FIG. 1 is a sealed cell constructed by housing a flat-shaped wound electrode body 20 and an electrolytic solution 80 in a flat angular cell case (that is, an outer container) 30. The cell case 30 is provided with a positive electrode terminal 42 and a negative electrode terminal 44 for external connection, and a thin-walled safety valve 36 designed to release the internal pressure when the internal pressure of the cell case 30 rises above a predetermined level. Further, the cell case 30 is provided with an injection port (not shown) for injecting the electrolytic solution 80. The positive electrode terminal 42 is electrically connected to a positive electrode current collector plate 42a. The negative electrode terminal 44 is electrically connected to a negative electrode current collector plate 44a. As a material of the cell case 30, for example, a lightweight and thermally conductive metal material such as aluminum is used.

Figure 2:
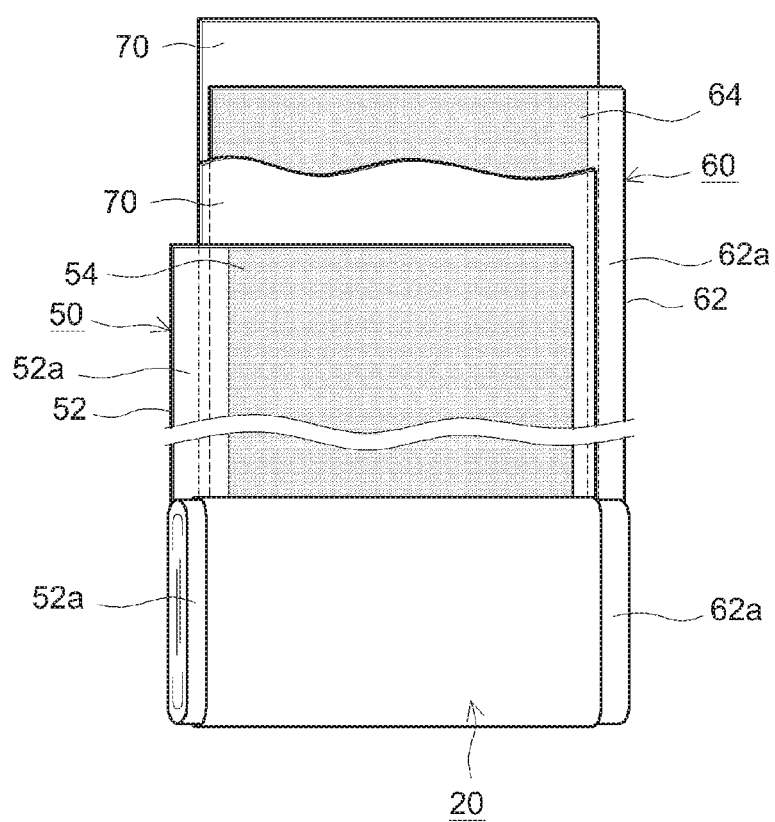
FIG. 2 is a schematic view showing a configuration of a wound electrode body of a lithium ion secondary cell using a non-aqueous electrolytic solution according to an embodiment of the present teaching.

As shown in FIGS. 1 and 2, the wound electrode body 20 has a form obtained by laminating a positive electrode sheet 50 in which a positive electrode active material layer 54 is formed along the longitudinal direction on one side or both sides (here, both sides) of an elongated positive electrode current collector 52, and a negative electrode sheet 60 in which a negative electrode active material layer 64 is formed along the longitudinal direction on one side or both sides (here, both sides) of an elongated negative electrode current collector 62, with two elongated separator sheets 70 being interposed therebetween, and by winding then the resulting laminate in the longitudinal direction. The positive electrode current collector plate 42a and the negative electrode current collector plate 44a are joined respectively to a positive electrode active material layer non-formation portion 52a (that is, a portion where the positive electrode active material layer 54 is not formed and the positive electrode current collector 52 is exposed) and a negative electrode active material layer non-formation portion 62a (that is, a portion where the negative electrode active material layer 64 is not formed and the negative electrode current collector 62 is exposed) which are formed to protrude outward from both ends of the wound electrode body 20 in the winding axis direction (that is, the sheet width direction orthogonal to the longitudinal direction).

As the positive electrode sheet 50 and the negative electrode sheet 60, sheets similar to those used in the conventional lithium ion secondary cells can be used without particular limitation. One typical embodiment is shown below.

Examples of the positive electrode current collector 52 constituting the positive electrode sheet 50 include an aluminum foil and the like. The positive electrode active material contained in the positive electrode active material layer 54 is, for example, a lithium transition metal oxide (for example, $LiNi_{1/3}Co_{1/3}Mn_{1/3}O_2$, $LiNiO_2$, $LiCoO_2$, $LiFeO_2$, $LiMn_2O_4$, $LiNi_{0.5}Mn_{1.5}O_4$ and the like), a lithium transition metal phosphoric acid compound (for example, $LiFePO_4$ and the like) and the like. The positive electrode active material layer 54 can include components other than the active material, such as a conductive material, a binder, and the like. As the conductive material, for example, carbon black such as acetylene black (AB) and other carbon materials (for example, graphite and the like) can be suitably used. As a binder, for example, polyvinylidene fluoride (PVDF) and the like can be used.

Examples of the negative electrode current collector 62 constituting the negative electrode sheet 60 include a copper foil and the like. As a negative electrode active material contained in the negative electrode active material layer 64, for example, a carbon material such as graphite, hard carbon, soft carbon, and the like; lithium titanate ($Li_4Ti_5O_{12}$: LTO); Si; Sn and the like can be used. The negative electrode active material layer 64 may include a component other than the active material, such as a binder and a thickener. As the binder, for example, styrene butadiene rubber (SBR) can be used. As a thickener, for example, carboxymethylcellulose (CMC) and the like can be used.

The separator 70 can be exemplified by a porous sheet (film) made of a resin such as polyethylene (PE), polypropylene (PP), a polyester, cellulose, a polyamide and the like. The porous sheet may have a single layer structure, or may have a laminated structure including two or more layers (for example, a three-layer structure in which a PP layer is laminated on both sides of a PE layer). A heat-resistant layer (HRL) may be provided on the surface of the separator 70.

As the electrolytic solution 80, the above-described non-aqueous electrolytic solution for a lithium ion secondary cell according to the present embodiment is used. Note that FIG. 1 does not strictly indicate the amount of the electrolytic solution 80 injected into the cell case 30.

The lithium ion secondary cell 100 configured as described above can be used for various applications. Suitable applications include driving power supplies mounted on vehicles such as an electric vehicle (EV), a hybrid vehicle (HV), a plug-in hybrid vehicle (PHV) and the like. The lithium ion secondary cell 100 can also be used in the form of a cell pack typically formed by connecting a plurality of cells in series and/or in parallel.

The angular lithium ion secondary cell 100 provided with the flat-shaped wound electrode body 20 was explained as an example. However, the lithium ion secondary cell can also be configured as a lithium ion secondary cell provided with a stacked type electrode assembly. The lithium ion secondary cell can also be configured as a cylindrical lithium ion secondary cell, a laminate type lithium ion secondary cell, or the like.

Examples relating to the present teaching are described hereinbelow, but the present teaching is not intended to be limited to the features disclosed in the examples.

Preparation of Electrolytic Solutions of Examples and Comparative Examples

As a non-aqueous solvent, a mixed solvent including ethylene carbonate (EC), dimethyl carbonate (DMC) and ethyl methyl carbonate (EMC) at a volume ratio of EC:DMC:EMC=30:40:30 was prepared. In this mixed solvent, the light metal salt and the silyl sulfate compound shown in Table 1 were dissolved in the addition amounts shown in Table 1, and $LiPF_6$ was dissolved at a concentration of 1.0 mol/L. Thus, non-aqueous electrolytic solutions for lithium ion secondary cells of Examples 1 to 12 and Comparative Examples 1 to 5 were prepared.

Preparation of Lithium Ion Secondary Cells for Evaluation $LiNi_{1/3}Co_{1/3}Mn_{1/3}O_2$ (LNCM) as a positive electrode active material powder, acetylene black (AB) as a conductive material, and polyvinylidene fluoride (PVdF) as a binder were taken at a mass ratio of LNCM:AB:PVdF=87:10:3 and mixed with N-methylpyrrolidone (NMP) to prepare a slurry for forming a positive electrode active material layer. The slurry was coated in a strip shape on both sides of a long aluminum foil, dried, and then roll-pressed to produce a positive electrode sheet.

Natural graphite-based carbon material (C) as a negative electrode active material, styrene butadiene rubber (SBR) as a binder, and carboxymethyl cellulose (CMC) as a thickener were taken at a mass ratio of C:SBR:CMC=98:1:1 and mixed with ion-exchange water to prepare a slurry for forming a negative electrode active material layer. The slurry was coated in a strip shape on both surfaces of a long copper foil, dried, and then roll-pressed to produce a negative electrode sheet.

Further, a separator sheet (a porous polyolefin sheet having a three-layered structure of PP/PE/PP) having an air permeability of about 250 sec/100 cc according to a Gurley test method was prepared.

The produced positive electrode sheet and the negative electrode sheet were opposed to each other, with the separator sheet interposed therebetween, to produce an electrode body.

Current collectors were attached to the produced electrode body, and the electrode body was housed and sealed together with the non-aqueous electrolytic solution of each Example and each Comparative Example in a laminate case. Thus, lithium ion secondary cells for evaluation were produced.

Activation Treatment

Each of the produced lithium ion secondary cells for evaluation was placed in a thermostatic chamber of 25° C. Each lithium ion secondary cell was constant-current charged to 4.10 V at a current value of 0.3 C, and then constant-current discharged to 3.00 V at a current value of 0.3 C. This charging-discharging cycle was repeated three times.

Evaluation of Initial Characteristics

Each activated lithium ion secondary cells for evaluation was placed in a thermostatic chamber of 25° C. Each lithium ion secondary cell was constant-current charged to 4.10 V at a current value of 0.2 C, and then constant-voltage charging was performed until the current value became 1/50 C, so that a fully charged state (SOC 100%) was reached. Thereafter, constant-current discharging to 3.00 V was performed at a current value of 0.2 C. The discharge capacity at this time was measured, and the measurement result was used as the initial capacity.

Further, each activated lithium ion secondary cell for evaluation was placed in a thermostatic chamber of 25° C., and constant-current charged up to SOC 30% at a current value of 0.3 C. Thereafter, discharge was performed for 10 sec at current values of 5 C, 15 C, 30 C, and 45 C, and the respective cell voltages were measured. Each current value and each voltage value were plotted with the current value as the abscissa and the voltage value as the ordinate, and the IV resistance was determined from the slope of the primary approximation straight line. This IV resistance was taken as the initial resistance. The initial resistance of Comparative Example 1 was taken as 100, and ratios of the initial resistance of each Example and other Comparative Examples were calculated. The ratios obtained are shown in Table 1.

High-Temperature Storage Test

Each lithium ion secondary cell for evaluation described above was charged to a SOC of 100% at a current value of 0.3 C, and then stored in a thermostatic chamber at 60° C. for 1 month. The discharge capacity of each lithium ion secondary cell for evaluation was measured by the same method as described above, and the discharge capacity at this time was determined as the cell capacity after high-temperature storage. A capacity retention ratio (%) was determined as (cell capacity after high-temperature storage/initial capacity)×100.

In addition, the IV resistance (cell resistance after high temperature storage) of each lithium ion secondary cell for evaluation was measured by the same method as described above. The resistance increase ratio (%) was determined from{1−(cell resistance after high-temperature storage/initial resistance)}×100.

The results are shown in Table 1.

TABLE 1

| | Light metal salt | Addition amount (% by weight) | Silyl sulfate compound | Addition amount (% by weight) | Initial resistance ratio | Capacity storage ratio after high-temperature storage (%) | Resistance increase ratio after high-temperature storage (%) |
|---|---|---|---|---|---|---|---|
| Example 1 | LiBOB | 1.0 | $(TMS)_2SO_4$ | 1.0 | 95 | 87.2 | 7.2 |
| Example 2 | LiBOB | 0.5 | $(TMS)_2SO_4$ | 1.0 | 88 | 87.1 | 7.1 |
| Example 3 | LiBOB | 0.1 | $(TMS)_2SO_4$ | 1.0 | 82 | 85.5 | 10.1 |
| Example 4 | LiBOB | 0.5 | $(TMS)_2SO_4$ | 2.0 | 81 | 86.1 | 7.0 |
| Example 5 | LiBOB | 0.5 | $(TMS)_2SO_4$ | 3.0 | 82 | 86.0 | 7.0 |
| Example 6 | LiBOB | 0.5 | $(TMS)_2SO_4$ | 5.0 | 85 | 86.8 | 8.0 |
| Example 7 | LiBOB | 0.5 | $(TMS)_2SO_4$ | 0.1 | 98 | 87.0 | 7.5 |
| Example 8 | LiBOB | 1.5 | $(TMS)_2SO_4$ | 1.0 | 99 | 87.3 | 7.3 |
| Example 9 | LiBOB | 0.5 | $(TES)_2SO_4$ | 1.0 | 87 | 87.2 | 7.4 |
| Example 10 | LiBOB | 0.5 | $(DMMES)_2SO_4$ | 1.0 | 84 | 87.5 | 6.8 |
| Example 11 | LiDFOB | 0.5 | $(DMMES)_2SO_4$ | 1.0 | 80 | 86.9 | 7.9 |
| Example 12 | LiPFO | 0.5 | $(DMMES)_2SO_4$ | 1.0 | 81 | 87.2 | 7.7 |
| Comparative Example 1 | None | 0 | None | 0 | 100 | 85.0 | 14.4 |
| Comparative Example 2 | LiBOB | 0.5 | None | 0 | 107 | 86.0 | 8.3 |
| Comparative Example 3 | None | 0 | $(TMS)_2SO_4$ | 1.0 | 81 | 81.5 | 15.1 |
| Comparative Example 4 | LiBOB | 0.5 | $(TMS)_2SO_4$ | 0.05 | 105 | 85.9 | 7.6 |
| Comparative Example 5 | LiBOB | 0.05 | $(TMS)_2SO_4$ | 1.0 | 81 | 82.0 | 15.3 |

The abbreviations in the table are as follows.
LiBOB: lithium bis(oxalato)borate
LiDFOB: lithium difluoro(oxalato)borate
LiPFO: lithium difluoro bis(oxalato)phosphate
$(TMS)_2SO_4$: bis(trimethylsilyl)sulfate
$(TES)_2SO_4$: bis(triethylsilyl)sulfate
$(DMMES)_2SO_4$: bis[dimethyl(2-methoxyethyl)silyl] sulfate From the results shown in Table 1, it is understood that when the content of the light metal salt in the non-aqueous electrolytic solution is 0.1% by mass or more and 1.5% by mass or less, and the content of the silyl sulfate compound is 0.1% by mass or more and 5.0% by mass or less, the characteristic that the initial resistance is low and the characteristic that the resistance increase after high-temperature storage is small can be achieved at the same time. In addition, it is understood that the capacity retention ratio after high-temperature storage is high.

Specifically, from the comparison of Example 2 and Comparative Examples 1 to 3, it is understood that the combined use of the light metal salt and the silyl sulfate compound results in that the characteristic that the initial resistance is low and the characteristic that the resistance increase after high-temperature storage is small can be achieved at the same time.

Further, from the results of Examples 2, 9 and 10, it is understood that the desired effects can be obtained even if the type of silyl sulfate compound is changed.

From the results of Examples 10 to 12, it is understood that the desired effects can be obtained even if the type of the light metal salt is changed.

From the results of Examples 1 to 8 and Comparative Examples 4 and 5, it is understood that the desired effects can be obtained when the addition amounts of the light metal salt and the silyl sulfate compound are within the specific ranges.

Further, as can be seen from the comparison between Example 2 and Comparative Examples 2 and 3, the initial resistance ratio and the resistance increase ratio of Example 2 are both less than the average value (94) of the initial resistance ratios of Comparative Examples 2 and 3 and less than the average value (11.7) of the resistance increase ratios of Comparative Examples 2 and 3. From this, it can be understood that according to the present embodiment, it is possible to obtain an effect exceeding the sum total of the effect of adding the light metal salt and the effect of adding the silyl sulfate compound. This is considered to be because a coating film derived from the light metal salt and formed on the electrode was modified by the sulfate moiety of the silyl sulfate compound.

From the above, it is understood that with the non-aqueous electrolytic solution for a lithium ion secondary cell according to the above-described embodiment, the initial resistance of the lithium ion secondary cell can be reduced, and the increase in resistance when the lithium ion secondary cell is allowed to stand at high temperature can be suppressed.

Although the specific examples of the present teaching have been described above in detail, these are merely examples and do not limit the scope of the claims. The art set forth in the claims includes various changes and modifications of the specific examples illustrated above.

What is claimed is:

1. A non-aqueous electrolytic solution for a lithium ion secondary cell, comprising:
   a light metal salt represented by the following formula (I); and
   a silyl sulfate compound selected from bis[dimethyl(2-methoxyethyl)silyl] sulfate, wherein
   a content of the light metal salt in the non-aqueous electrolytic solution for a lithium ion secondary cell is 0.1% by mass or more and 1.5% by mass or less, and
   a content of the silyl sulfate compound in the non-aqueous electrolytic solution for a lithium ion secondary cell is 0.1% by mass or more and 5.0% by mass or less,

[C1]

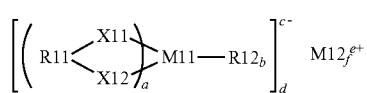
(I)

wherein R11 represents a —C(=O)—R—C(=O)— group (R represents an alkylene group, a halogenated alkylene group, an arylene group, or a halogenated arylene group), or a —C(=O)—C(=O)— group; R12 represents a halogen atom, an alkyl group, a halogenated alkyl group, an aryl group or a halogenated aryl group; X11 and X12 independently represent an oxygen atom or a sulfur atom; M11 represents a transition metal element or a Group 13 element, a Group 14 element or a Group 15 element in the periodic table; M12 represents a Group 1 element, a Group 2 element in the periodic table, or an aluminum element; a is an integer of 1 to 4; b is an integer of 0 to 8; c is an integer of 1 to 3; d is an integer of 1 to 3; e is an integer of 1 to 3; and f is an integer of 1 to 3.

2. The non-aqueous electrolytic solution for a lithium ion secondary cell according to claim 1, wherein the light metal salt is at least one oxalate complex selected from the group consisting of lithium bis(oxalato)borate, lithium difluoro(oxalato)borate, lithium difluorobis(oxalato)phosphate, and lithium tetrafluoro(oxalato)phosphate.

3. The non-aqueous electrolytic solution for a lithium ion secondary cell according to claim 1, wherein the non-aqueous electrolytic solution does not include bis(triethyl silyl)sulfate.

4. A lithium ion secondary cell comprising the non-aqueous electrolytic solution for a lithium ion secondary cell according to claim 1.

5. A lithium ion secondary cell comprising the non-aqueous electrolytic solution for a lithium ion secondary cell according to claim 2.

* * * * *